(12) United States Patent
Barillot et al.

(10) Patent No.: US 12,173,779 B2
(45) Date of Patent: Dec. 24, 2024

(54) ASSEMBLY FOR A DIFFERENTIAL UNIT OF A VEHICLE

(71) Applicant: Volvo Truck Corporation, Gothenburg (SE)

(72) Inventors: Thomas Barillot, Mornant (FR); Jean Terrat, Malleval (FR); Bertrand Cauvin, Reyrieux (FR); Grégory Bouteille, Genilac (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/594,197

(22) Filed: Mar. 4, 2024

(65) Prior Publication Data
US 2024/0301943 A1 Sep. 12, 2024

(30) Foreign Application Priority Data
Mar. 9, 2023 (EP) .................................... 23160898

(51) Int. Cl.
| | |
|---|---|
| *F16H 48/24* | (2006.01) |
| *B60K 17/16* | (2006.01) |
| *F16H 48/08* | (2006.01) |
| *F16H 48/30* | (2012.01) |

(52) U.S. Cl.
CPC ........... *F16H 48/24* (2013.01); *B60K 17/165* (2013.01); *F16H 48/08* (2013.01); *F16H 48/30* (2013.01)

(58) Field of Classification Search
CPC .......... F16H 48/24; F16H 48/08; F16H 48/30; B60K 17/165
See application file for complete search history.

(56) References Cited

U.S. PATENT DOCUMENTS

| | | | | |
|---|---|---|---|---|
| 5,176,590 A | * | 1/1993 | Haydock | F16H 48/24 |
| | | | | 475/249 |
| 2003/0184171 A1 | | 10/2003 | Teraoka et al. | |
| 2005/0173180 A1 | * | 8/2005 | Hypes | B60K 17/16 |
| | | | | 475/2 |
| 2007/0225106 A1 | | 9/2007 | Veldman et al. | |
| 2008/0182702 A1 | | 7/2008 | Donofrio et al. | |
| 2024/0117870 A1 | * | 4/2024 | Surve | F16H 48/24 |

FOREIGN PATENT DOCUMENTS

| | | | | |
|---|---|---|---|---|
| DE | 3831493 A | * | 3/1990 | ............. B60K 23/04 |
| WO | 2019192729 A1 | | 10/2019 | |

OTHER PUBLICATIONS

Extended European Search Report for European Patent Application No. 23160898.5, mailed Jul. 31, 2023, 11 pages.

* cited by examiner

*Primary Examiner* — Tisha D Lewis
(74) *Attorney, Agent, or Firm* — Withrow & Terranova, PLLC

(57) ABSTRACT

An assembly for a differential unit of a vehicle, including a differential housing having a longitudinal axis, the differential housing being provided with a plurality of through-holes formed therein; a differential side gear configured to be connected to a drive shaft capable of being connected to a wheel of a vehicle, the differential side gear being located inside the differential housing and being rotatably mounted relative to the differential housing around the longitudinal axis; and a blocking system for blocking the differential unit operation, including a blocking member movable between a released position and a blocking position, and an actuation system for moving the blocking member between the released and blocking positions.

14 Claims, 13 Drawing Sheets

[Fig. 1]
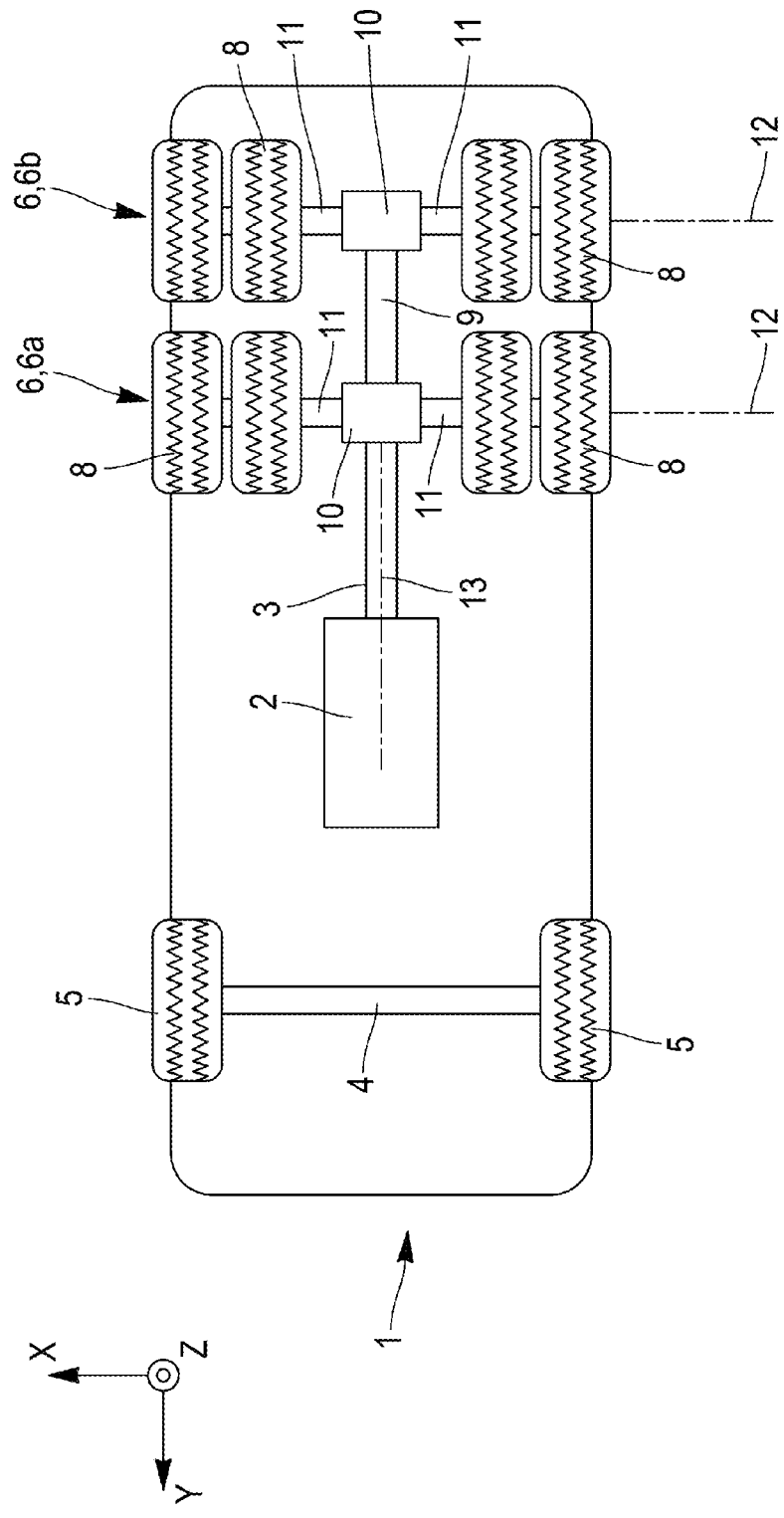

[Fig. 2]
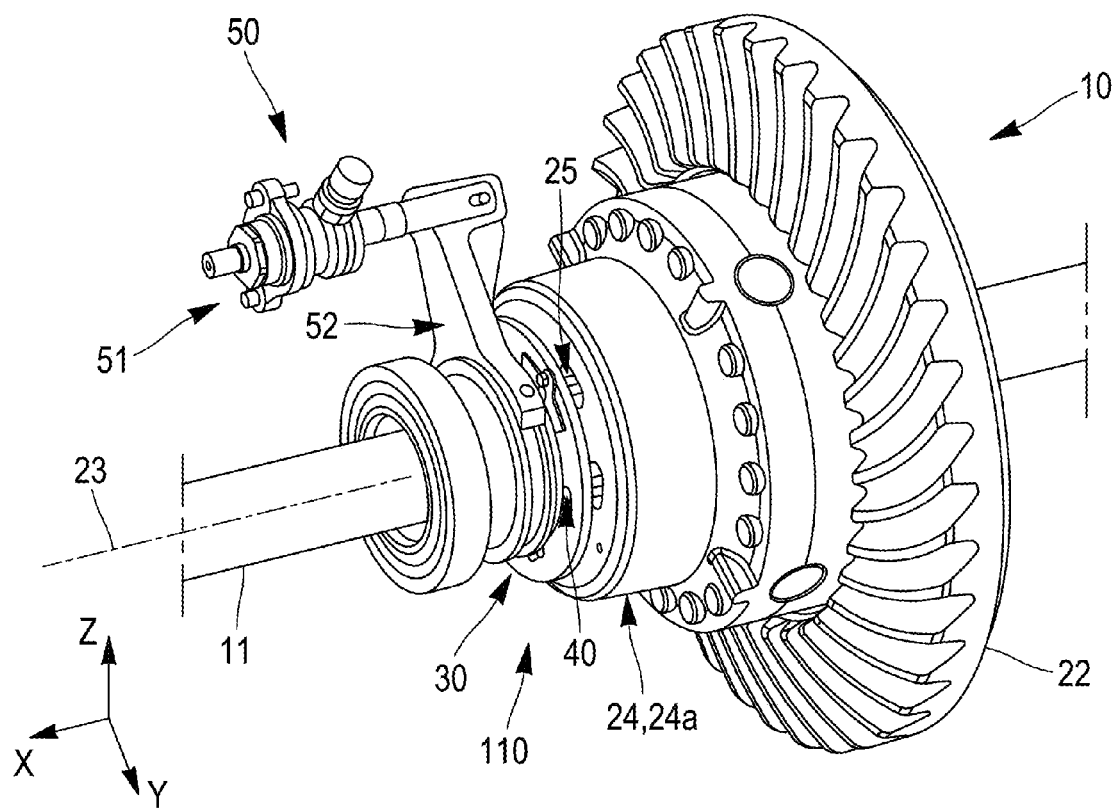

[Fig. 3]
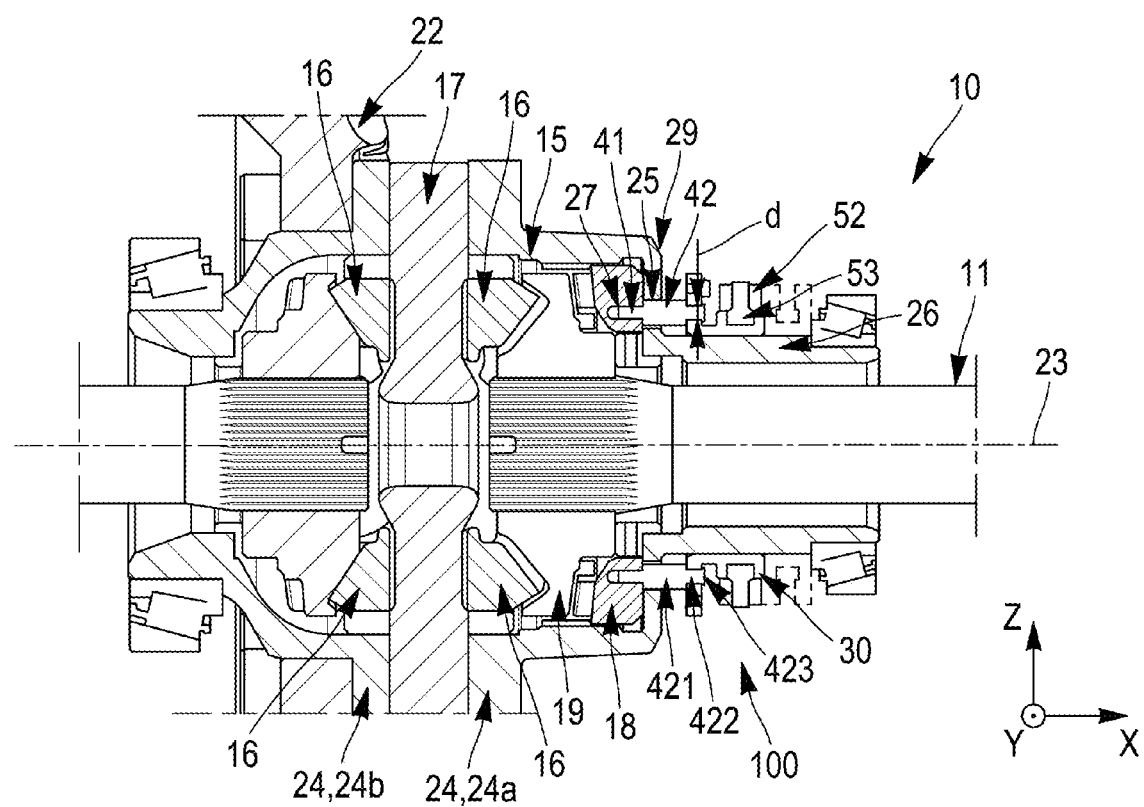

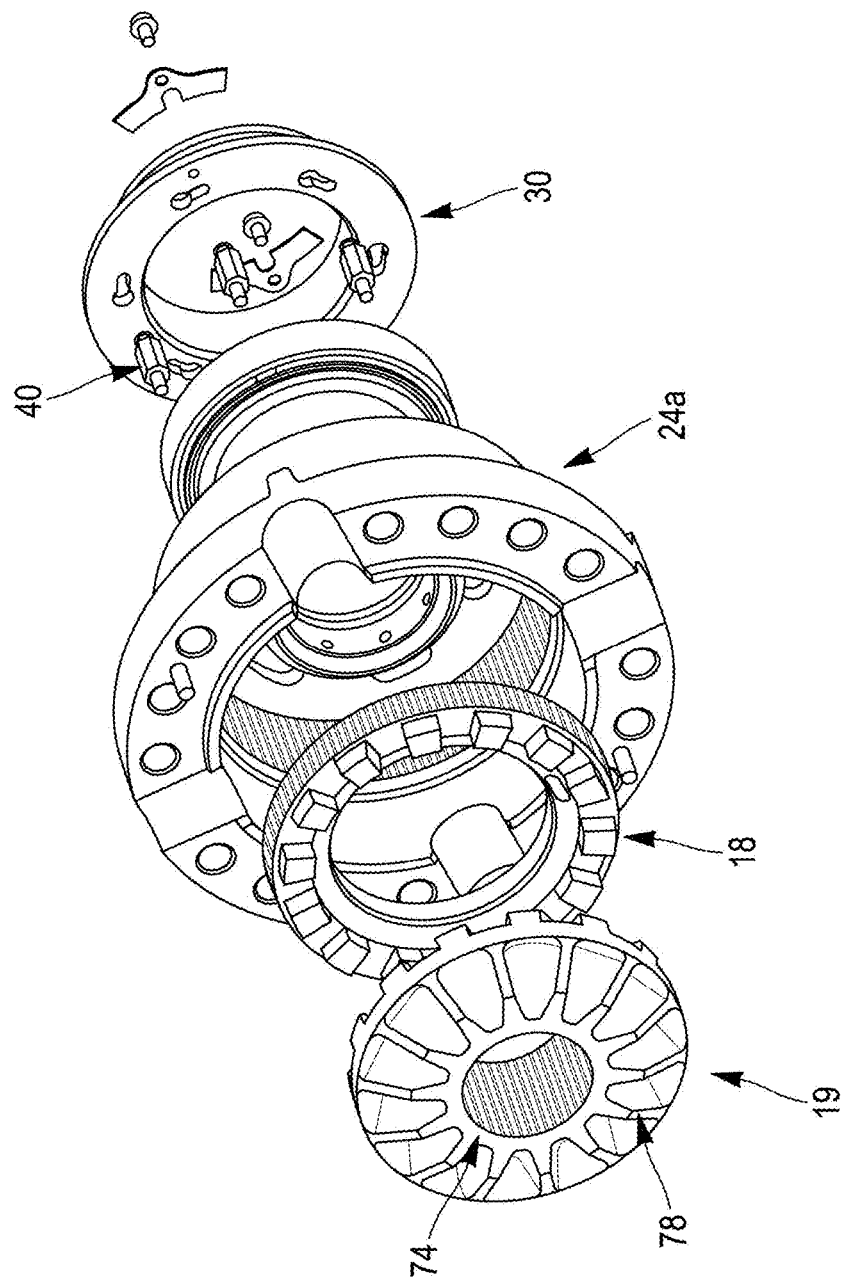
[Fig. 4]

[Fig. 5]
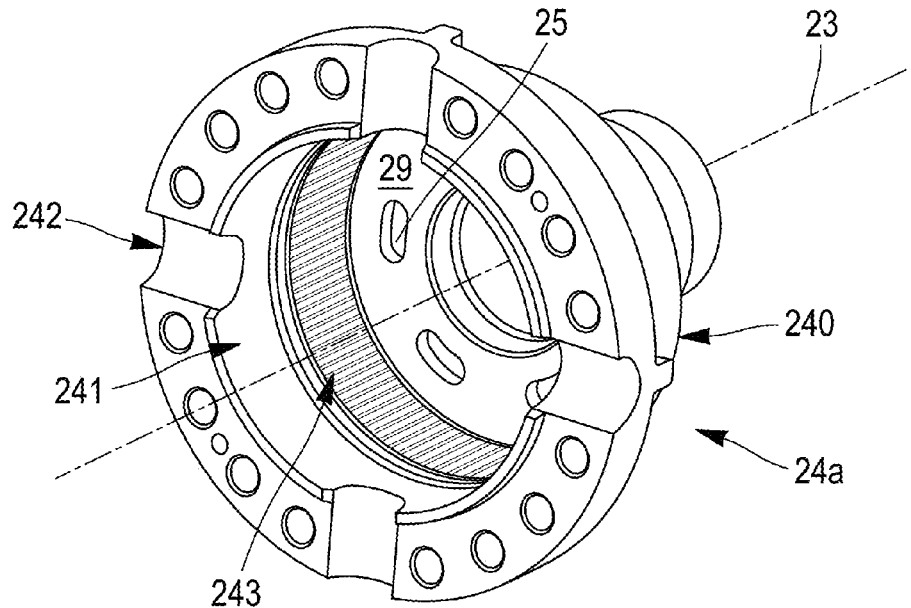
[Fig. 6]
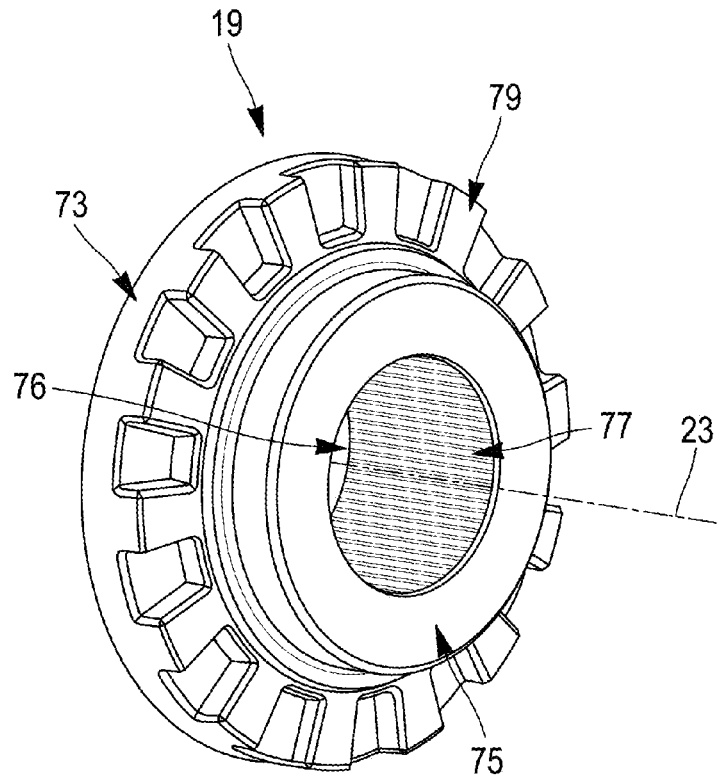

[Fig. 7]
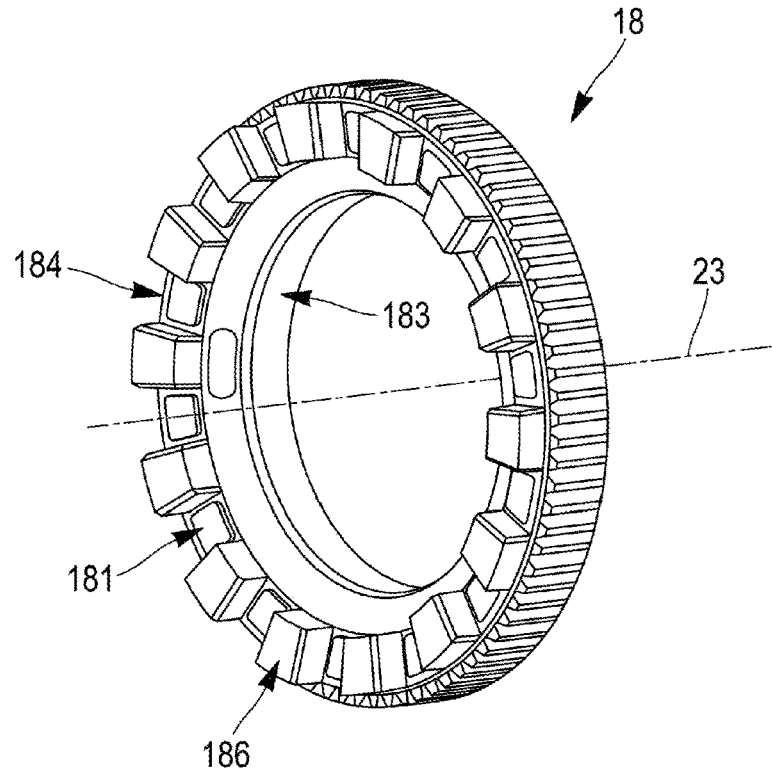
[Fig. 8]
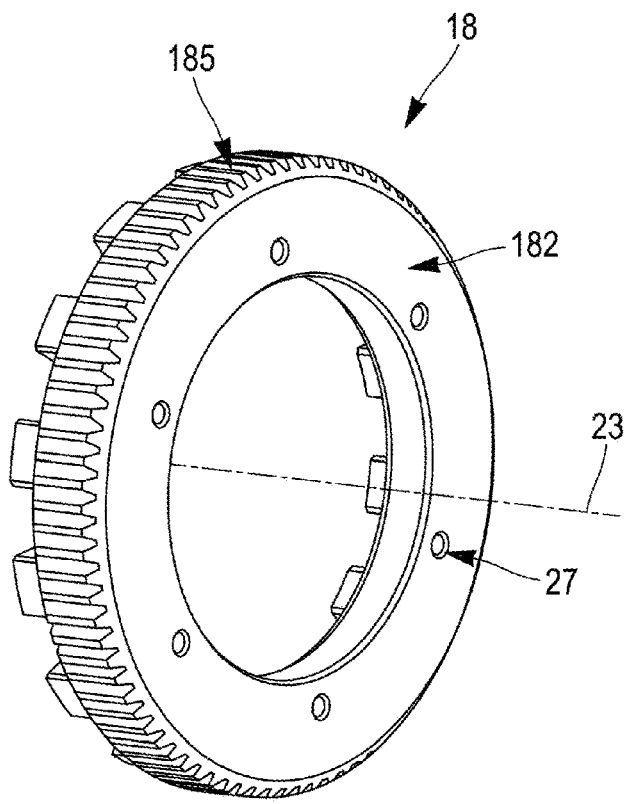

[Fig. 9]
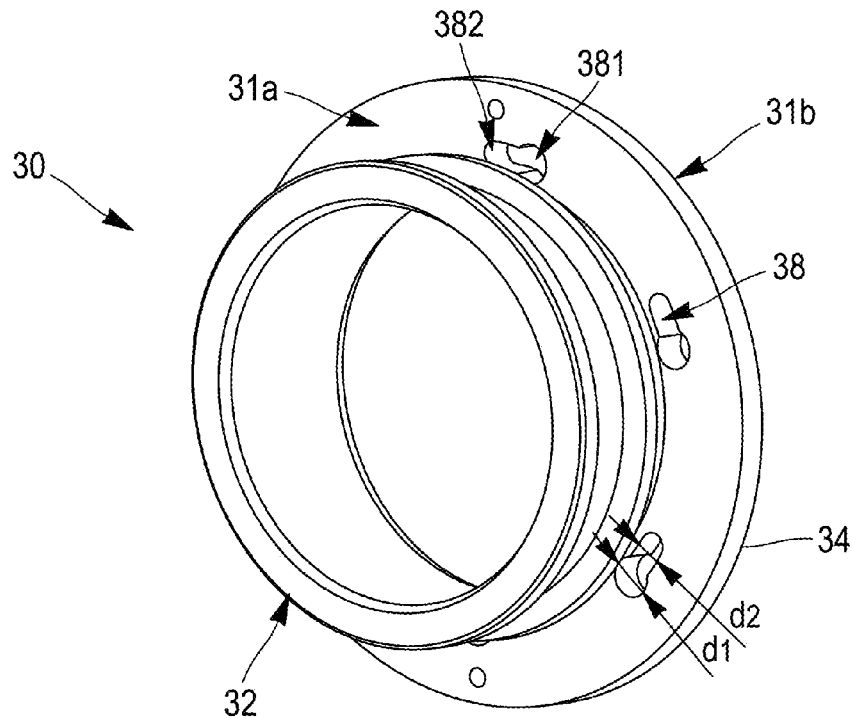
[Fig. 10]
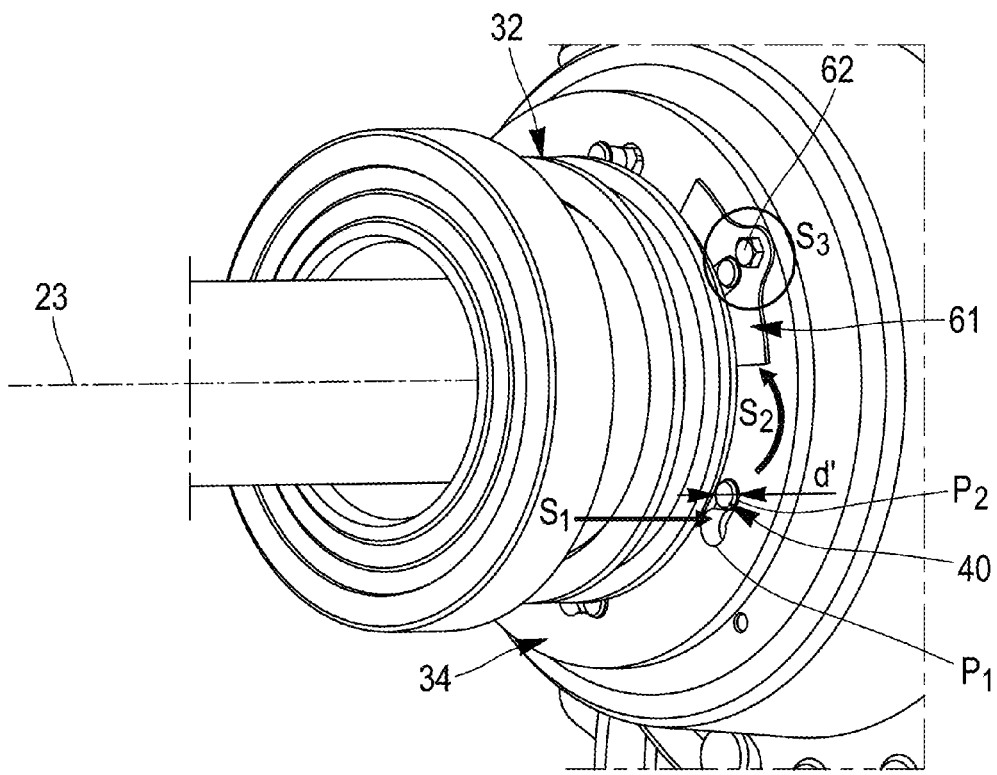

[Fig. 11A]
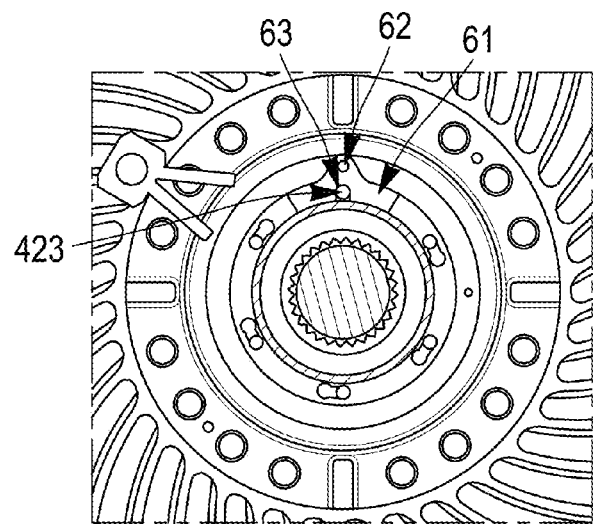
[Fig. 11B]
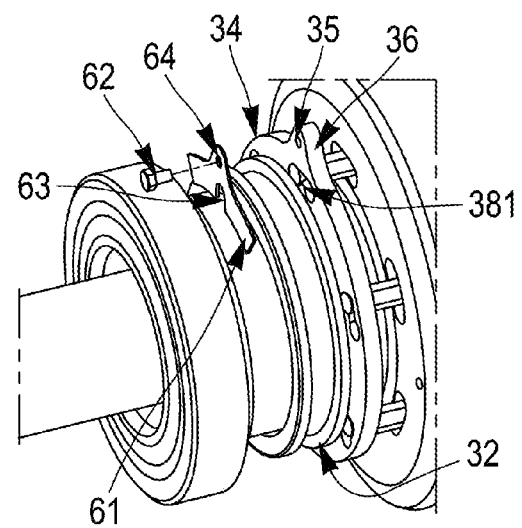

[Fig. 11C]
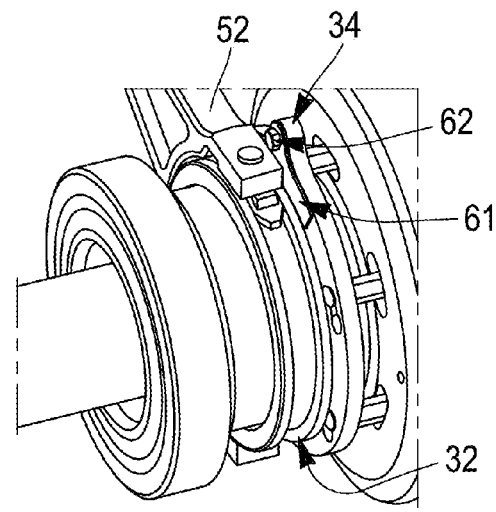
[Fig. 12A]
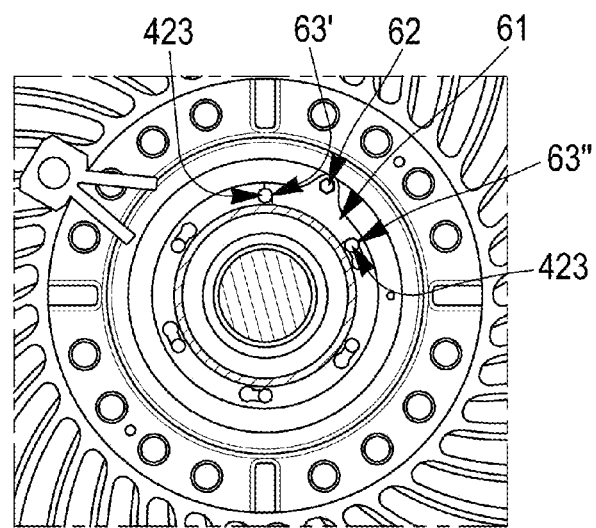

[Fig. 12B]
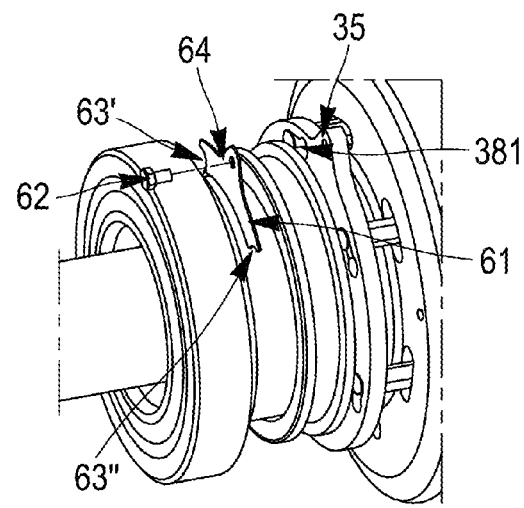
[Fig. 12C]
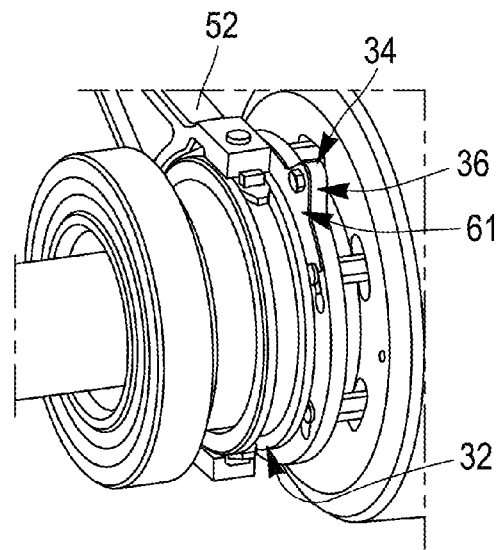

[Fig. 13A]
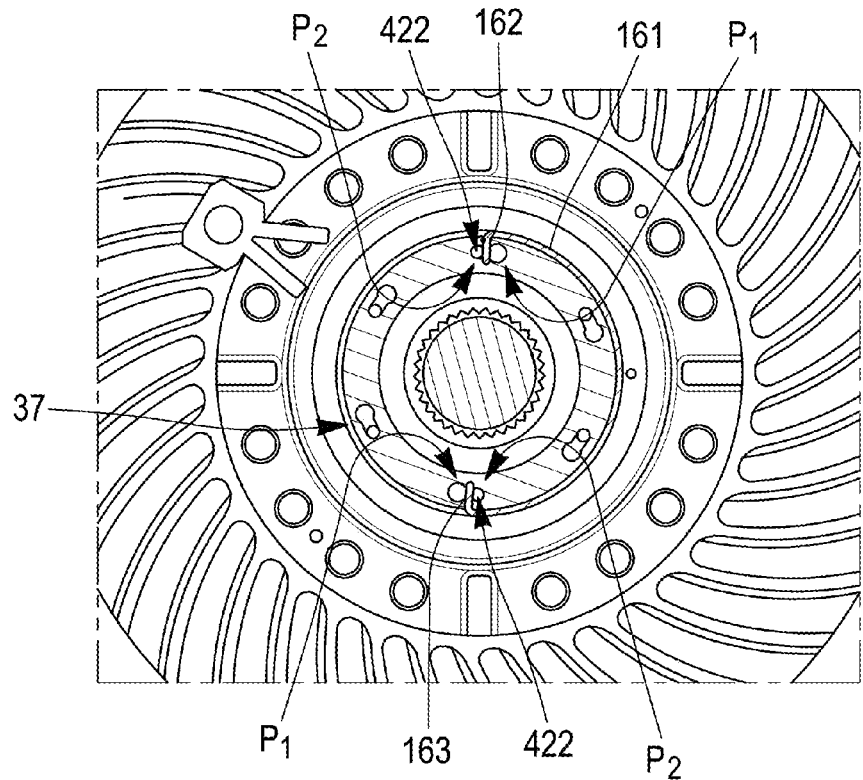
[Fig. 13B]
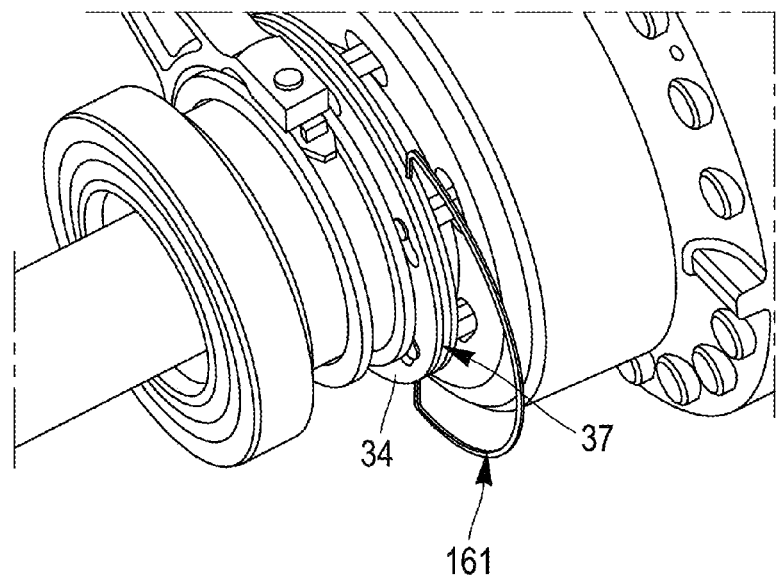

[Fig. 14A]
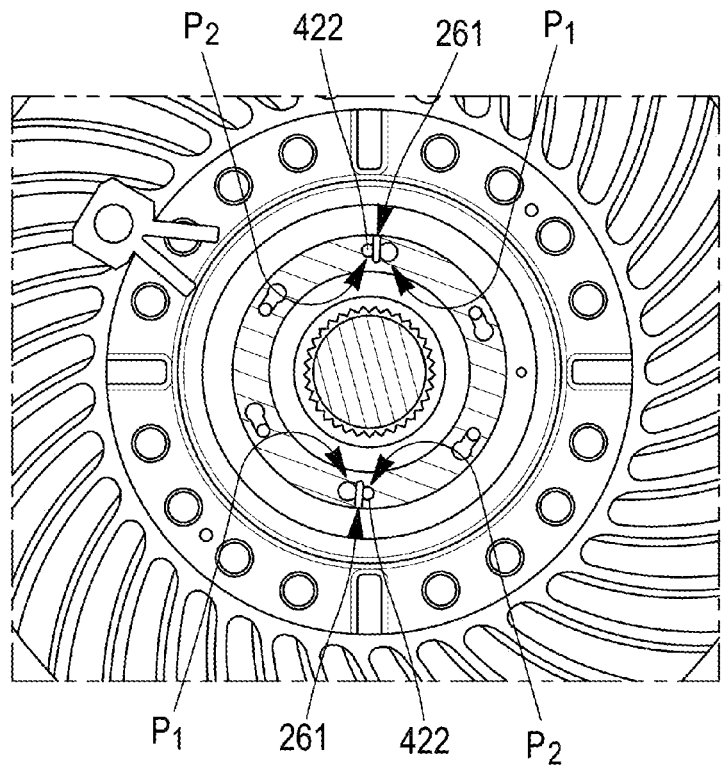
[Fig. 14B]
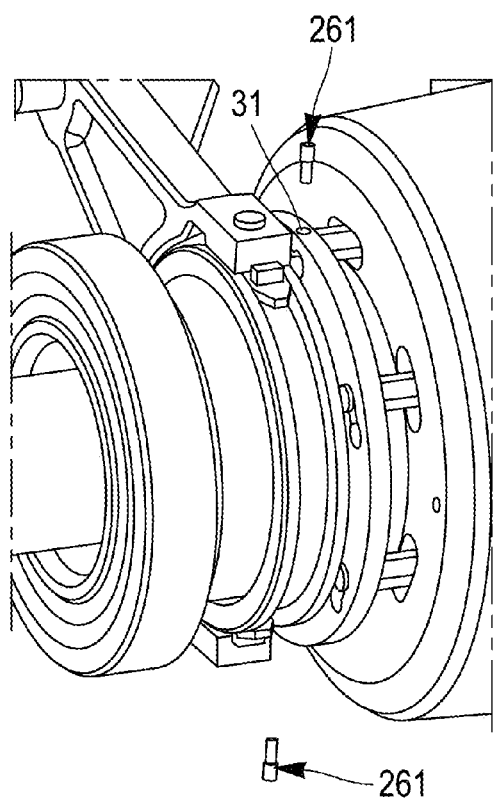

[Fig. 15A]
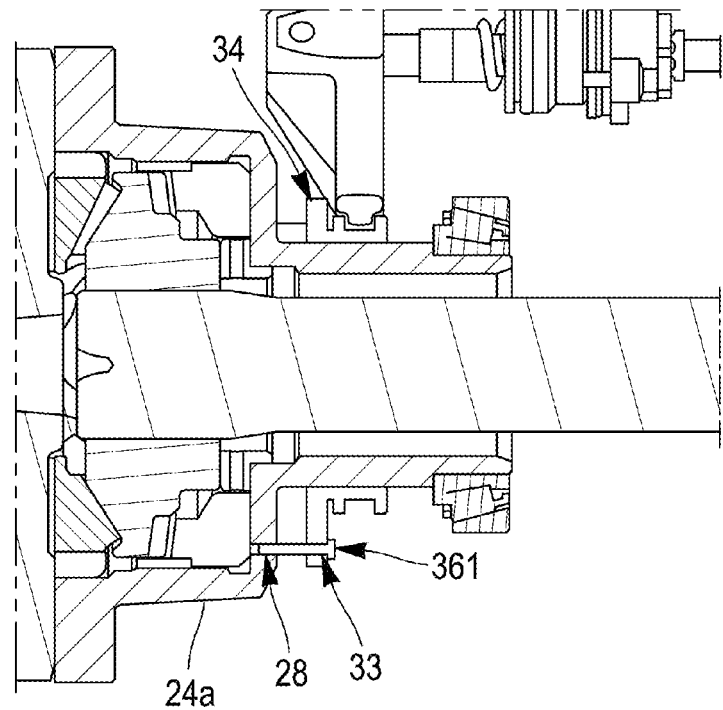
[Fig. 15B]
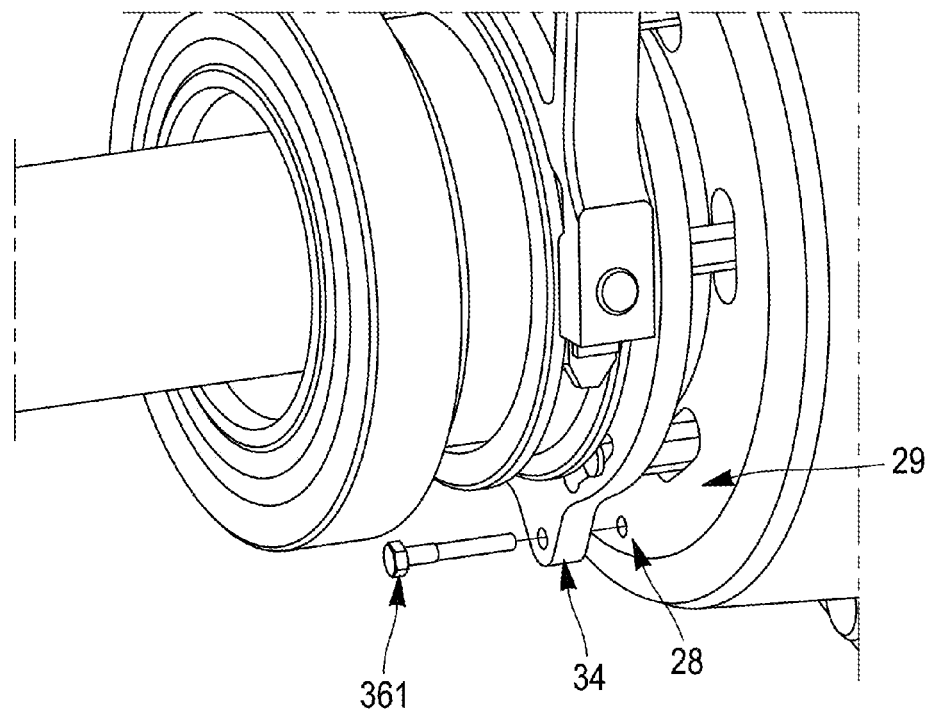

ASSEMBLY FOR A DIFFERENTIAL UNIT OF A VEHICLE

PRIORITY APPLICATIONS

The present application claims priority to European Patent Application No. 23160898.5, filed on Mar. 9, 2023, and entitled "ASSEMBLY FOR A DIFFERENTIAL UNIT OF A VEHICLE," which is incorporated herein by reference in its entirety.

TECHNICAL FIELD

The disclosure relates generally to a differential unit of a vehicle. In particular aspects, the disclosure relates to an assembly for a differential unit of a vehicle. The invention also relates to a vehicle comprising such an assembly. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle such as a truck is generally equipped with one or several differential units on its driven axles.

A differential unit typically comprises a differential carrier housing which contains the differential mechanism, i.e.: a crown wheel driven by a pinion secured to an input shaft, a differential arranged inside the crown wheel and comprising pinions and gears, and a differential housing arrangement containing the differential and part of drive shafts connected to a wheel of the vehicle, either directly or via a wheel reduction. The differential housing arrangement can typically be made of two "half" differential housings connected to each other, with one secured to the crown wheel through welding or screws, on both sides thereof, the differential housings thus being mounted in the differential carrier housing.

The differential allows the corresponding left and right wheels to have different speeds when turning/maneuvering. The maximum torque transfer through a mechanical differential is limited to the lowest wheel adherence. Consequently, if a wheel is spinning-typically on a low grip surface such as mud, sand, snow, etc.—very few torque is transferred to the second wheel and the truck is stuck, the torque transferred to the wheel not being enough to move the vehicle.

To avoid such a situation, a differential unit can be equipped with a blocking system which makes it possible to block the differential unit operation, and to transfer torque to the wheel still gripping on the ground, thereby allowing the truck to move.

However, the conventional differential units can be fairly bulky, which of course is unfavorable as available space is generally limited in a vehicle.

More specifically, such a blocking system is generally located at one end area of the differential unit, according to the transverse direction of the vehicle, and configured to rotationally secure the drive shaft and the differential housing. This may cause some problems, as the transverse width of a vehicle, in particular a truck, is limited to a maximum value given by regulatory requirements. In particular, vehicles having an independent wheel suspension configuration require an increased length in the transverse direction of the vehicle. This means that conventional blocking systems cannot be implemented on a truck having an independent wheel suspension configuration without wheel reduction. Indeed, as the torque to be transmitted by the drive shaft is high, the drive shaft has to be sized accordingly, which is generally not compatible with the regulatory requirements on the vehicle maximum width.

A known solution to this problem may consist in a differential blocking system disposed inside the differential housing and comprising an actuating ring moving a dog clutch adapted to lock/unlock a differential side gear toward a differential housing. This solution sets several issues. Firstly, it needs a large-sized fork to move the actuating ring. This large-sized fork widely increases the radial dimension of the differential housing. Secondly, the large contact area between the actuating ring and the fork increases the friction therebetween, thus leading to losses and wear. Thirdly, this solution impacts on the dog clutch case hardening profile, which may lead to a crack initiation during the dog clutch case hardening. Finally, this solution is relatively complex to assemble.

SUMMARY

According to a first aspect of the disclosure, the disclosure relates to an assembly for a differential unit of a vehicle, comprising:
  a differential housing having a longitudinal axis, the differential housing being provided with a plurality of through-holes formed therein;
  a differential side gear configured to be connected to a drive shaft capable of being connected to a wheel of a vehicle, the differential side gear being located inside the differential housing and being rotatably mounted relative to the differential housing around the longitudinal axis;
  a blocking system for blocking the differential unit operation, comprising:
    a blocking member movable between a released position and a blocking position, and
    an actuation system for moving the blocking member between said released and blocking positions;
  wherein:
    the blocking member is mounted inside the differential housing in a rotationally fixed manner relative to the differential housing, and can slide relative to the differential housing, along the longitudinal axis, between the released position, in which the blocking member is spaced apart from the differential side gear, thus allowing a rotational movement of the differential side gear relative to the differential housing around the longitudinal axis, and the blocking position, in which the blocking member and the differential side gear are rotationally secured to one another by the cooperation between at least one engagement portion of the blocking member and at least one engagement portion of the differential side gear, thus preventing a rotational movement of the differential side gear relative to the differential housing around the longitudinal axis;
  characterized in that the actuation system comprises:
    an actuation ring slidably mounted around a bearing journal of the differential housing, the actuation ring having a grooved portion, which extends at the outer periphery of the actuation ring, and an end flange, which is axially distant from the grooved portion,
    a plurality of connecting pins securely connected, at a distal end, to the end flange of the actuation ring and, at a proximal end, to the blocking member, the connecting pins axially extending through the through-holes of the differential housing, a fork-shaped element capable of sliding relative to the differential housing along the longitudinal axis, the fork-shaped element being configured to be at least partially received inside the grooved portion of the actuation ring, thus allowing an axial displacement of the actuation ring via the fork-shaped element.

The first aspect of the disclosure may seek to provide a blocking system that may be disposed in an area adjacent to the differential unit in the transverse direction of the vehicle, thus saving space. A technical benefit may include the possibility to implement such a blocking system on a differential unit for a heavy-duty vehicle having an independent wheel suspension configuration without wheel reduction. A further technical benefit may include the possibility to use a small-sized fork-shaped element to move the blocking member, thus saving space around the differential housing and minimizing friction on the fork-shaped element and losses. A further technical benefit may include the possibility to keep a conventional profile for the dog clutch case, thus reducing the risk of a crack initiation during the side gear case hardening. Finally, a technical benefit may include the possibility to connect the actuating ring to the blocking member in a quick and simple manner.

In some examples, the at least one engagement portion of the blocking member comprises at least one raised or depressed relief, said at least one engagement portion being preferably in the form of a plurality of teeth extending from the periphery of the blocking member, with the blocking member being ring-shaped, and configured to be engaged in a set of teeth arranged on the differential side gear.

In some examples, an inner face of the differential housing is provided with at least one raised or depressed relief and an outer face of the blocking member is provided with at least one corresponding depressed or raised relief, the inner face of the differential housing and the outer face of the blocking member preferably being provided with corresponding longitudinally extending splines which allow a relative longitudinal sliding movement and prevents a relative rotational movement around the longitudinal axis between the blocking member and the differential housing.

In some examples, the radial dimension of the grooved portion of actuating ring is less than the radial dimension of the end flange thereof.

In some examples, the end flange of the actuation ring comprises a plurality of mounting holes, each mounting hole being adapted to slidably receive one connecting pin between a first mounting position, in which the connecting pin can move axially along the longitudinal axis relative to the actuation ring, and a second mounting position, in which any relative axial movement between the connecting pin and the actuation ring is prevented.

In some examples, the proximal end of each connecting pin has a narrowed section along its outer periphery, the narrowed section being surrounded by two enlarged sections, the diameter of the narrowed section being less than the diameter(s) of the enlarged sections, and in that each mounting hole has a first area adapted to at least partially receive the enlarged sections of the proximal portion of one connecting pin in the first mounting position thereof, and a second area adapted to at least partially receive the narrowed section of the proximal end of the connecting pin in the second mounting position thereof, the second area being dimensioned so as to prevent an axial movement of said connecting pin relative to the actuation ring when the narrowed section thereof is at least partially received in said second area.

In some examples, the assembly further comprises at least one securing element adapted to prevent the movement of the connecting pins from their second mounting position to their first mounting position.

In some examples, the at least one securing element comprises a plate fixedly connected to the actuation ring, the plate having at least one notch along its outer periphery, the at least one notch being adapted to at least partially receive an enlarged section of the proximal end of one connecting pin that protrudes axially from the end flange of the actuation ring in the second mounting position of the connecting pin, the plate being positioned so as to prevent the movement of said connecting pin from its second mounting position to its first mounting position when the enlarged section thereof is at least partially received in the said at least one notch.

In some examples, the at least one securing element comprises a semi-circular spring disposed inside an annular groove formed around the outer periphery of the end flange of the actuation ring, the spring having a first radially oriented end that abuts against the narrowed section of the proximal end of a first connecting pin in the second mounting position thereof and a second radially oriented end that abuts against the narrowed section of the proximal end of a second connecting pin in the second mounting position thereof, the first radially oriented end and the second radially oriented end being substantially positioned between the first and second mounting positions of the first connecting pin and the second connecting pin, respectively.

In some examples, the at least one securing element comprises at least one screw threadedly received in a threaded hole radially formed in the outer periphery of the end flange of the actuation ring, the at least one screw being in contact with the narrowed section of the proximal end of one connecting pin in the second mounting position thereof and being substantially positioned between the first and second mounting positions of said connecting pin.

In some examples, the at least one securing element comprises a screw at least partially lodged in an axially oriented through-hole formed inside the end flange of the actuation ring, the screw being threadedly received inside an axially oriented threaded hole formed in an outer face of the differential housing.

In some examples, the at least one securing element comprises a screw at least partially lodged in an axially oriented threaded hole formed in an outer face of the differential housing, the screw being threadedly received inside an axially oriented through-hole formed inside the end flange of the actuation ring.

According to a second aspect of the disclosure, the disclosure relates to a vehicle comprising the assembly as above defined.

In some examples, the vehicle is a truck.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 1 is a schematic drawing of an underside of a vehicle showing a driven wheel system including a differential unit according to an embodiment of the invention.

FIG. 2 is a perspective view of a differential unit, showing an assembly according to a first embodiment of the invention, the assembly comprising a blocking member, an actuating ring and connecting pins.

FIG. 3 is a cross section view of the differential unit of FIG. 2.

FIG. 4 is an exploded partial view of the assembly illustrated in FIG. 2.

FIG. 5 is a perspective of the differential housing illustrated in FIG. 4.

FIG. 6 is a perspective view of the differential side gear illustrated in FIG. 4.

FIG. 7 and FIG. 8 are perspective views of the blocking member illustrated in FIG. 4.

FIG. 9 is a perspective view of the actuation ring illustrated in FIG. 4.

FIG. 10 is an enlarged view of the assembly shown in FIG. 2.

FIG. 11A is a side view of a differential unit, showing an assembly according to a second embodiment of the invention, the assembly comprising an actuating ring and connecting pins.

FIG. 11B is a perspective view of the assembly shown in FIG. 11A, the connecting pins being partially connected to the actuation ring.

FIG. 11C is a view similar to FIG. 11B, the connecting pins being securely connected to the actuation ring.

FIG. 12A is a side view of a differential unit, showing an assembly according to a third embodiment of the invention, the assembly comprising an actuation ring and connecting pins.

FIG. 12B is a perspective view of the assembly shown in FIG. 12A, the connecting pins being partially connected to the actuation ring.

FIG. 12C is a view similar to FIG. 12B, the connecting pins being securely connected to the actuation ring.

FIG. 13A is a side and partly cut view of a differential unit, showing an assembly according to a fourth embodiment of the invention, the assembly comprising an actuation ring and connecting pins.

FIG. 13B is a perspective view of the assembly shown in FIG. 13A, the connecting pins being partially connected to the actuation ring.

FIG. 14A is a side and partly cut view of a differential unit, showing an assembly according to a fifth embodiment of the invention, the assembly comprising an actuation ring and connecting pins.

FIG. 14B is a perspective view of the assembly shown in FIG. 14A, the connecting pins being partially connected to the actuation ring.

FIG. 15A is a cross section view of a differential unit, showing an assembly according to a sixth embodiment of the invention, the assembly comprising an actuation ring and connecting pins.

FIG. 15B is a perspective view of the assembly shown in FIG. 15A, the connecting pins being partially connected to the actuation ring.

DETAILED DESCRIPTION

Aspects set forth below represent the necessary information to enable those skilled in the art to practice the disclosure.

As shown in FIG. 1, a vehicle 1 comprises an engine 2 that drives an input shaft 3 having an axis 13, and a front axle 4 connected to front wheels 5.

The vehicle 1 also comprises at least one driven wheel system 6. The or each driven wheel system 6 has an axis 12, and comprises a differential unit 10 and at least partly two drive shafts 11. Each drive shaft 11 has a first end connected to the differential unit 10 and a second end connected to at least one wheel 8. In the illustrated embodiment, the vehicle 1 comprises a first driven rear wheel system 6a and a second driven rear wheel system 6b located rearwards from the first driven rear wheel system 6a. Each rear wheel system 6a, 6b can comprise two wheels 8 on either side, thus forming a dual mounted tires arrangement.

An additional shaft 9 connects the input shaft 3 to the differential unit 10 of the second driven rear wheel system 6b, through the differential unit 10 of the first driven rear wheel system 6a, and is the input shaft for the differential unit 10 of the second driven rear wheel system 6b.

FIG. 2 and FIG. 3 illustrates a differential unit 10 including an assembly 110 according to an embodiment of the present invention. The differential unit 10 comprises a crown wheel 22 having a longitudinal axis 23. The crown wheel 22 is driven in rotation around said longitudinal axis 23 by an input shaft (not shown), by engagement of teeth arranged on a pinion (not shown) mounted on said input shaft and teeth arranged on the crown wheel 22.

In the following paragraphs, the longitudinal direction X is defined as a direction parallel to the longitudinal axis 23 of the crown wheel 22. In the operating position, i.e. when the differential unit is mounted under the vehicle, the longitudinal direction X corresponds the transverse direction of the vehicle, i.e. the axes of the rear wheel systems. Direction X is substantially horizontal when the vehicle is on a horizontal surface.

Besides, the transverse direction Y is defined as the direction which is orthogonal to the longitudinal direction X and substantially horizontal when the vehicle is on a horizontal surface.

Moreover, direction Z is defined as the vertical direction when the vehicle is on a horizontal surface.

The invention will be described when the vehicle is on a horizontal surface.

Inside the crown wheel 22 is arranged a differential 15 which comprises differential side pinions 16, for example four differential side pinions, which are fitted on a joint cross 17, and two differential side gears 19. Each differential side gear 19 meshes with at least one differential side pinion 16 and is secured in rotation to a first end of one of left and right drive shafts 11, each drive shaft 11 having a second end connected to at least one wheel of the vehicle.

The differential unit 10 further comprises a differential housing arrangement 24 which contains the differential 15 and part of the drive shafts 11, namely the part of each drive shaft 11 which is located near the first end of said drive shaft 11. The differential housing arrangement 24 is secured to the crown wheel 22. It may be made of two parts, namely a left differential housing 24a and a right differential housing 24b, each forming a sleeve around the corresponding differential side gears 18 and drive shaft 11, said differential housings 24a, 24b being fastened on both sides of the joint cross 17.

Thus, on each side of the joint cross 17, the differential side gear 18 is mounted at the first end of the drive shaft 11 in a rotationally fixed manner. Furthermore, both the differential side gear 18 and the drive shaft 11 are rotatably mounted relative to the differential housing 24a, 24b around the longitudinal axis 23. A bearing journal 26 forms a cylindrical section of the left differential housing 24a that is arranged around one drive shaft 11.

The differential unit 10 further comprises a blocking system 100 for blocking the differential unit operation. The blocking system 100 comprises a blocking member 18 movable between a released position and a blocking position, and an actuation system 50 for moving the blocking member 18 between said released and blocking positions.

The whole blocking system 100 can be located inside a differential carrier housing (not shown). The blocking system 100 can be located in an area substantially facing one differential housing along a direction orthogonal to the longitudinal axis 23, preferably facing the differential housing 24a that does not extend inside the crown wheel 22.

The differential housing 24a, differential side gear 19 and blocking system 100 form an assembly 110.

According to the invention, the blocking member 18 is located inside the differential housing 24a and is configured to rotationally secure said differential housing 24a and the corresponding differential side gear 19, i.e. the differential side gear 19 located in said differential housing 24a.

As shown in FIG. 4 and FIG. 5, the differential housing 24a may have a peripheral wall 40 having a substantially tubular shape, generally not with a constant diameter. Said differential housing 24a has the same longitudinal axis 23 as the crown wheel 22 in the mounted position; it further has an inner face 241 and an outer face 242.

On the inner face 241, the differential housing 24a may comprise means for forming an inner sliding connection with the blocking member 18 along the longitudinal axis 23. These means can comprise at least one raised or depressed relief, for example longitudinal extending splines 243.

A "sliding connection" between two parts is a connection that allows a relative sliding movement of said parts along the longitudinal axis 23, but prevents a relative rotation movement between said parts around this longitudinal axis 23.

On the outer face 242, the differential housing 24a can comprise means for forming an outer sliding connection along the longitudinal axis 23 with part of the actuation system 50, more specifically with an actuation ring 30 of said actuation system 50.

The differential housing 24a may also comprise a plurality of through-holes 25 provided in a radially-oriented wall 29. Each through-hole 25 is configured to partially receive a connecting pin 40 that securely connect the actuation ring 30 to the blocking member 18. The through-holes 25 are preferably elongated in the longitudinal direction 23. There may be provided at least four through-holes 25 preferably regularly angularly spaced on the radially-oriented wall 29 of the differential housing 24a.

As shown on FIG. 7 and FIG. 8, the blocking member 18 may have a substantially cylindrical peripheral wall 181, and has the same longitudinal axis 23 as the crown wheel 22 in the mounted position. Said blocking member 18 further has an inner face 183 and an outer face 184.

On its outer face 184, the blocking member 18 may have longitudinal extending splines 185 for cooperation with the splines 243 of the differential housing 24a, or another means for providing a sliding connection between the blocking member 18 and the differential housing 24a, along the longitudinal axis 23.

The blocking member 18 may further have at least one engagement portion for forming a rotationally coupled connection around the longitudinal axis 23 with the differential side gear 19. Preferably, this engagement portion is in the form of a plurality of teeth 186 which extend from the periphery of the blocking member 18. The teeth 186 may extend axially from the periphery of the blocking member 18; they can have a parallelepiped shape. In other words, the blocking member 18 may be a dog clutch.

The blocking member 18 may further have a radially-oriented annular side 182 that faces the radially-oriented wall 29 of the differential housing 24a. A plurality of threaded holes 27 may be provided in said radially-oriented annular side 182. Each through-hole 27 is configured to cooperate with a corresponding threaded end 41 of one connecting pin 40 that securely connect the actuation ring 30 to the blocking member 18. The threaded holes 27 are preferably elongated in the longitudinal direction 23. There may be provided at least four threaded holes 27 preferably regularly angularly spaced on the radially-oriented annular side 182 of the blocking member 18.

As shown on FIG. 4 and FIG. 6, the differential side gear 19 preferably has an annular shape. It may comprise a disc-shaped plate 73 having two opposite faces, namely one face 74 facing the crown wheel 22 and an opposite face 75. The differential side gear 19 has the same longitudinal axis 23 as the crown wheel 22 in the mounted position.

The differential side gear 19 is provided with a central hole 76 for receiving the drive shaft 11 in a rotationally fixed manner. To that end, the central hole 76 may comprise inner longitudinally extending splines 77. On the face 74 facing the crown wheel 22, the differential side gear 19 comprises a first set of teeth 78 for meshing with at least one differential side pinion 16 of the differential unit 10.

Furthermore, the differential side gear 19 may comprise a second set of teeth 79, which preferably protrude outwardly from a peripheral region of the differential gear 19 and axially from the face 75, for engagement with the teeth 186 of the blocking member 18. Alternatively, the differential side gear 19 and the blocking member 18 could be provided with other complementary engagement portions for forming a rotationally coupled connection around the longitudinal axis 23 between the differential side gear 19 and the blocking member 18. Preferably, said engagement can be achieved by interference, for example between complementary raised or depressed reliefs.

As shown in FIG. 9, the actuation ring 30 may have a substantially ring-shaped profile, and has the same longitudinal axis 23 as the crown wheel 22 in the mounted position. The actuation ring 30 comprises an annular end flange 34, which has an inner face 31b facing the radially-oriented wall 29 of the differential housing 24a, and a grooved portion 32 that extends at the outer periphery of the actuation ring 30. Said grooved portion 32 is axially distant from an end flange 34 and its radial dimension is less than the radial dimension of the end flange 34. As explained in greater detail in the below paragraphs, the grooved portion 32 is adapted to cooperate with a fork-shaped element 52 of an actuating system (as shown in FIG. 2) to move the actuation ring 30 relative to the differential housing 24a along the longitudinal axis 23 between a proximal position (shown in dotted lines in FIG. 3) and a distal position (shown in solid lines in FIG. 3), the distance along the longitudinal axis 23 between the actuation ring 30 and the radially-oriented wall 29 of the differential housing 24a being greater in the proximal position than in the distal position.

The end flange 34 is provided with a plurality of axially oriented through-holes 38 disposed around its circumference. Each through-hole 38 has a first area 381 having a substantially circular cross section and a second area 382 having a substantially circular cross section, the diameter d2 of the second area 382 being less than the diameter d1 of the first area 381. The first and second areas 381, 382 may communicate with each other via an intermediate area or overlap one on the other, as illustrated in FIG. 9.

As shown in FIG. 3 and FIG. 10, each mounting hole 38 is adapted to receive a modular connecting pin 40 that axially projects from the inner face 31b of the end flange 30 when the connecting pin 40 is securely mounted on the actuation ring 30. Each connecting pin 40 comprises a distal end 41, which is axially distant from the inner face 31b when the connecting pin 40 is securely mounted on the actuation ring 30, and a proximal end 42, which is received in one of the mounting holes 38 of the actuation ring 30. The distal end 41 may advantageously be threadedly receive in one of the threaded holes 27 of the blocking member 18, thus fixedly connecting the connecting pin 40 to the blocking member 18. The proximal end 42 is substantially cylindrical and has a narrowed section 422 along its outer periphery, the narrowed section 422 being surrounded by two enlarged sections: a right enlarged section 421, which extends between the distal end 41 and the narrowed section 422, and a left enlarged section 423, which axially projects from an outer face 31a of the end flange 30 when the connecting pin 40 is securely mounted on the actuation ring 30. The diameter d of the narrowed section 422 is less than the diameters d' of the enlarged sections 421, 423.

As shown in FIG. 3, when the locking member 18 and the actuation ring 30 are securely connected together via the connecting pins 40, and when the actuation ring 30 is in its proximal position, the distance along the longitudinal axis 23 between the locking member 18 and the differential side gear 19 is sufficiently low to form a rotationally coupled connection around the longitudinal axis 23 between the differential side gear 19 and the blocking member 18 by the cooperation between the teeth 186 of the blocking member 18 and the teeth 79 of the differential side gear 19. A rotational movement of the differential side gear 19 relative to the differential housing 24a around the longitudinal axis 23 is thus prevented. This corresponds to the blocking position of the blocking member 18. On the contrary, when the locking member 18 and the actuation ring 30 are securely connected together via the connecting pins 40, and when the actuation ring 30 is in its distal position, the blocking member 18 is spaced apart from the differential side gear 19, such that the teeth 186 of the blocking member 18 are disengaged from the teeth 79 of the differential side gear 19. A rotational movement of the differential side gear 19 relative to the differential housing 24a around the longitudinal axis 23 is thus allowed. This corresponds to the released position of the blocking member 18.

The successive steps permitting to securely mount one connecting pin 40 to the actuation ring 30 is described by reference to FIG. 10.

In a first step S1, the connecting pin 40 is axially aligned with the first area 381 of a through-hole 38 of the actuation ring 30 and the locking pin 40 is moved axially along the longitudinal axis 23 to reach a first mounting position P1, in which its narrowed section 422 faces the second area 382 of the through-hole 38.

In a second step S2, the connecting pin 40 rotates relative to the actuation ring 30 about the longitudinal axis 23 to reach a second mounting position P2, in which its narrowed section 422 is received inside the second area 382 of the through-hole 38. In said second mounting position P2, any relative axial movement between the connecting pin 40 and the actuation ring 30 is prevented by the presence of the enlarged sections 421 and 423 of the connecting pin 40 against which abuts the actuation ring 30.

In a third step S3, at least one securing element is mounted on the actuation ring 30, the at least one securing element being configured to prevent any relative movement between the connecting pin 40 and the actuation ring 30. In particular, the securing element 61 is adapted to prevent that the connecting pin 40 moves from its second mounting position P2 to its first mounting position P1.

In the embodiment of FIG. 10, the at least one securing element comprises a plate 61 that is fixedly connected to the end flange 34 of the actuation ring 30 via a screw 62.

The alternative embodiment illustrated in FIG. 11A, FIG. 11B and FIG. 11C is substantially identical to the one illustrated in FIG. 10, except that the annular end flange 34 of the actuation ring 30 has a lower outer diameter and is provided with a radial projection 36, inside which is drilled a threaded hole 35. The threaded hole 35 cooperates with the screw 62 to fixedly connect the plate 61 on the actuation ring 30. The plate 61 has one notch 63 along its outer periphery, the notch 63 being adapted to at least partially receive the enlarged section 423 of the proximal portion 42 of the connecting pin 40 that protrudes axially from the end flange 34 when the connecting pin 40 is in its second mounting position P2 and the plate 61 is securely mounted on the actuation ring 30 via the screw 62. The plate 61 extending at both sides of the enlarged section 423, the plate 61 is axially aligned with the first area 381 of the mounting hole 38 that receives the connecting pin 40 in its first mounting position P1. Furthermore, the plate 61 may advantageously have an inner diameter that matches with an outer mating diameter of the actuation ring 30 such that any rotation of the plate 61 is avoided. Thus positioned and configured, the plate 61 prevents the connecting pin 40 moves from its second mounting position P2 to its first mounting position P1.

The alternative embodiment illustrated in FIG. 12A, FIG. 12B and FIG. 12C is substantially identical to the one illustrated in FIG. 11A, FIG. 11B and FIG. 11C, except that the plate 61 has two notches 63', 63" along its outer periphery, the notches 63', 63" being adapted to at least partially receive the enlarged sections 423 of the proximal portions 42 of two connecting pin 40 that protrude axially from the end flange 34 when the connecting pins 40 are in their second mounting position P2 and the plate 61 is securely mounted on the actuation ring 30 via the screw 62. The plate 61 extending between said enlarged sections 423, the plate 61 is axially aligned with the first area 381 of the mounting hole 38 that receives one of the two connecting pins 40 in its first mounting position P1. Thus positioned, the plate 61 prevents said connecting pin 40 moves from its second mounting position P2 to its first mounting position P1.

In the alternative embodiment illustrated in FIG. 13A and FIG. 13B, the at least one securing element comprises a hemi-circular spring 161 disposed inside an annular groove 37 formed around the outer periphery of the end flange 34 of the actuation ring 30. The spring 161 has a first radially oriented end 162 and a second radially oriented end 163. The first radially oriented end 162 abuts against the narrowed section 422 of the proximal portion 42 of a first connecting pin 40, when said first connecting pin 40 is in its second mounting position P2, and is substantially positioned between the first and second mounting positions P1, P2 of said first connecting pin 40. The second radially oriented end 163 abuts against the narrowed section 422 of the proximal portion 42 of a second connecting pin 40, when said second connecting pin 40 is in its second mounting position P2, and is substantially positioned between the first and second mounting positions P1, P2 of said second connecting pin 40. Thus positioned, the spring 161 prevents that the first and second connecting pins 40 move from their second mounting position P2 to their first mounting position P1.

In the alternative embodiment illustrated in FIG. 14A and FIG. 14B, the at least one securing element comprises a first screw 261 and a second screw 261 threadedly received, respectively, in a first threaded hole 31 and a second threaded hole 31 radially formed in the outer periphery of the end flange 34 of the actuation ring 30. The first screw 261 being in contact with the narrowed section 422 of the proximal portion 42 of a first connecting pin 40, when said first connecting pin 40 is in its second mounting position P2, and is substantially positioned between the first and second mounting positions P1, P2 of said first connecting pin 40. The second screw 261 is in contact with the narrowed section 422 of the proximal portion 42 of a second connecting pin 40, when said second connecting pin 40 is in its second mounting position P2, and is substantially positioned between the first and second mounting positions P1, P2 of said second connecting pin 40. Thus positioned, the first and second screws 161 prevent that the first and second connecting pins 40 move from their second mounting position P2 to their first mounting position P1.

In a further alternative embodiment (not shown), the at least one securing element comprises only one screw threadedly received in one threaded hole radially formed in the outer periphery of the end flange 34 of the actuation ring 30. The screw being in contact with the narrowed section 422 of the proximal portion 42 of one connecting pin 40, when said connecting pin 40 is in its second mounting position P2, and is substantially positioned between the first and second mounting positions P1, P2 of said connecting pin 40. Thus positioned, the screw prevents that the connecting pin 40 moves from its second mounting position P2 to their first mounting position P1.

In the alternative embodiment illustrated in FIG. 15A and FIG. 15B, the at least one securing element comprises a screw 361 that is at least partially lodged in an axially oriented through-hole 33 formed inside the end flange 34 of the actuation ring 30. The screw 361 is also threadedly received inside an axially oriented threaded hole 28 formed in the radially-oriented wall 29 of the differential housing 24a. The screw 361 thus prevents any relative rotational movement between the actuation ring 30 and the differential housing 24a, and thus any relative rotational movement between the connecting pins 40 and the actuation ring 30.

As shown in FIG. 2 and FIG. 3, the actuation system 50 may comprise a fork-shaped element 52 capable of sliding relative to the differential housing 24a along the longitudinal axis 23 under the action of an actuation device 51. The actuation device 51 may comprise a hydraulic actuator or any other actuator, and a spring for biasing the fork-shaped element 52 towards the released position.

The fork-shaped element 52 may comprise at least one finger 53 projecting from an inner wall of said fork-shaped element 52, the finger 53 being at least partially received inside the grooved portion 32 of the actuation ring 30. Thus configured, the fork-shaped element 52 transmits its axial movement to the actuation ring 30.

Due to the fact that the grooved portion 32 of the actuation ring 30 is disposed along a portion of the actuation ring 30 that is relatively close to the differential housing 24a along a radial direction, it is possible to use a small-sized fork-shaped element 52 to move the actuation ring 30, thus saving space around the differential housing and minimizing friction on the fork-shaped element and losses.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. An assembly for a vehicle differential unit, comprising:
   a differential housing having a longitudinal axis, the differential housing being provided with a plurality of through-holes formed therein;

a differential side gear configured to be connected to a drive shaft capable of being connected to a wheel of a vehicle, the differential side gear being located inside the differential housing and being rotatably mounted relative to the differential housing around the longitudinal axis; and a blocking system for blocking the differential unit operation, comprising:

a blocking member movable between a released position and a blocking position; and an actuation system for moving the blocking member between said released and blocking positions;

wherein the blocking member is mounted inside the differential housing in a rotationally fixed manner relative to the differential housing, and is configured to slide relative to the differential housing, along the longitudinal axis, between the released position, in which the blocking member is spaced apart from the differential side gear, thus allowing a rotational movement of the differential side gear relative to the differential housing around the longitudinal axis, and the blocking position, in which the blocking member and the differential side gear are rotationally secured to one another by the cooperation between at least one engagement portion of the blocking member and at least one engagement portion of the differential side gear, thus preventing a rotational movement of the differential side gear relative to the differential housing around the longitudinal axis; and wherein the actuation system comprises:

an actuation ring slidably mounted around a bearing journal of the differential housing, the actuation ring having a grooved portion, which extends at the outer periphery of the actuation ring, and an end flange, which is axially distant from the grooved portion;

a plurality of connecting pins securely connected, at a distal end, to the end flange of the actuation ring and, at a proximal end, to the blocking member, the connecting pins axially extending through the plurality of through-holes of the differential housing; and a fork-shaped element is configured to slide relative to the differential housing along the longitudinal axis, the fork-shaped element being configured to be at least partially received inside the grooved portion of the actuation ring, thus allowing an axial displacement of the actuation ring via the fork-shaped element.

2. The assembly of claim 1, wherein the at least one engagement portion of the blocking member comprises at least one raised or depressed relief, the at least one engagement portion being in the form of a plurality of teeth extending from the periphery of the blocking member, with the blocking member being ring-shaped, and configured to be engaged in a set of teeth arranged on the differential side gear.

3. The assembly of claim 1, wherein an inner face of the differential housing is provided with at least one raised or depressed relief and an outer face of the blocking member is provided with at least one corresponding depressed or raised relief, the inner face of the differential housing and the outer face of the blocking member being provided with corresponding longitudinally extending splines which allow a relative longitudinal sliding movement and prevents a relative rotational movement around the longitudinal axis between the blocking member and the differential housing.

4. The assembly of claim 1, wherein a radial dimension of the grooved portion of the actuation ring is less than the radial dimension of the end flange thereof.

5. The assembly of claim 1, wherein the end flange of the actuation ring comprises a plurality of mounting holes, each mounting hole being adapted to slidably receive one connecting pin between a first mounting position, in which the connecting pin is configured to move axially along the longitudinal axis relative to the actuation ring, and a second mounting position, in which any relative axial movement between the connecting pin and the actuation ring is prevented.

6. The assembly of claim 5, wherein the proximal end of each connecting pin has a narrowed section along an outer periphery, the narrowed section being surrounded by two enlarged sections, a diameter of the narrowed section being less than one or more diameters of the enlarged sections, and in that each mounting hole has a first area adapted to at least partially receive the enlarged sections of the proximal end of one connecting pin in the first mounting position thereof, and a second area adapted to at least partially receive the narrowed section of the proximal end of the connecting pin in the second mounting position thereof, the second area being dimensioned so as to prevent an axial movement of the connecting pin relative to the actuation ring when the narrowed section thereof is at least partially received in the second area.

7. The assembly of claim 6, further comprising at least one securing element adapted to prevent the movement of the connecting pins from the second mounting position to the first mounting position.

8. The assembly of claim 7, wherein the at least one securing element comprises a plate fixedly connected to the actuation ring, the plate having at least one notch along an outer periphery, the at least one notch being adapted to at least partially receive an enlarged section of the proximal end of one connecting pin that protrudes axially from the end flange of the actuation ring in the second mounting position of the connecting pin, the plate being positioned so as to prevent the movement of the connecting pin from the second mounting position to the first mounting position when the enlarged section thereof is at least partially received in the at least one notch.

9. The assembly of claim 7, wherein the at least one securing element comprises a semi-circular spring disposed inside an annular groove formed around the outer periphery of the end flange of the actuation ring, the spring having a first radially oriented end that abuts against the narrowed section of the proximal end of a first connecting pin in the second mounting position thereof and a second radially oriented end that abuts against the narrowed section of the proximal end of a second connecting pin in the second mounting position thereof, the first radially oriented end and the second radially oriented end being substantially positioned between the first and second mounting positions of the first connecting pin of the second connecting pin, respectively.

10. The assembly of claim 7, wherein the at least one securing element comprises at least one screw threadedly received in a threaded hole radially formed in the outer periphery of the end flange of the actuation ring, the at least one screw being in contact with the narrowed section of the proximal portion of one connecting pin in the second mounting position thereof and being substantially positioned between the first and second mounting positions of the connecting pin.

11. The assembly of claim 7, wherein the at least one securing element comprises a screw at least partially lodged in an axially oriented through-hole formed inside the end flange of the actuation ring, the screw being threadedly received inside an axially oriented threaded hole formed in an outer face of the differential housing.

12. The assembly of claim 7, wherein the at least one securing element comprises a screw at least partially lodged in an axially oriented threaded hole formed in an outer face of the differential housing, the screw being threadedly received inside an axially oriented through-hole formed inside the end flange of the actuation ring.

13. A vehicle comprising the assembly of claim 1.

14. The vehicle of claim 13, the vehicle being a truck.

* * * * *